United States Patent
Muratov

(10) Patent No.: US 9,158,829 B2
(45) Date of Patent: *Oct. 13, 2015

(54) SYSTEM AND METHOD OF DATA SECURITY IN SYNCHRONIZING DATA WITH A WIRELESS DEVICE

(71) Applicant: Good Technology Software, Inc., Redwood Shores, CA (US)

(72) Inventor: Alexander Muratov, Toronto (CA)

(73) Assignee: GOOD TECHNOLOGY SOFTWARE, INC., Redwood Shores, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 13/847,621

(22) Filed: Mar. 20, 2013

(65) Prior Publication Data

US 2013/0232112 A1 Sep. 5, 2013

Related U.S. Application Data

(63) Continuation of application No. 13/183,138, filed on Jul. 14, 2011, now Pat. No. 8,429,128, which is a continuation of application No. 11/261,529, filed on Oct. 25, 2005, now Pat. No. 8,001,082.

(60) Provisional application No. 60/622,813, filed on Oct. 28, 2004.

(51) Int. Cl.
*G06F 7/04* (2006.01)
*G06F 17/30* (2006.01)
(Continued)

(52) U.S. Cl.
CPC .... *G06F 17/30575* (2013.01); *G06F 17/30578* (2013.01); *G06F 21/60* (2013.01); *G06F 21/6218* (2013.01); *H04L 9/00* (2013.01); *G06F 2221/2113* (2013.01)

(58) Field of Classification Search
CPC .......... G06F 21/6218; G06F 17/30215; G06F 17/30575; G06F 21/60; G06F 2221/2107; G06F 17/30174; G06F 21/85; H04L 9/00
USPC .................................................. 707/610, 634
See application file for complete search history.

(56) References Cited

U.S. PATENT DOCUMENTS 4,714,995 A 12/1987 Materna
4,837,811 A 6/1989 Butler et al.
(Continued)

FOREIGN PATENT DOCUMENTS

CA 2149337 5/1995
EP 0813133 A2 12/1997
(Continued)

OTHER PUBLICATIONS

Apple Newton, 1995.
(Continued)

*Primary Examiner* — Bruce Moser
(74) *Attorney, Agent, or Firm* — EIP US LLP

(57) ABSTRACT

A system is disclosed. The system includes a server, a client application, and a first database. The first database is associated with the client application. The system further includes a second database to store data in an encrypted format, and a replicator to synchronize the data stored in the first and second databases. The system also includes a synchronizer to synchronize the data stored in the second database and the server based on a current security level.

18 Claims, 3 Drawing Sheets

(51) Int. Cl.
*H04L 9/00* (2006.01)
*G06F 21/60* (2013.01)
*G06F 21/62* (2013.01)

(56) References Cited

U.S. PATENT DOCUMENTS

| | | | |
|---|---|---|---|
| 4,882,752 A | 11/1989 | Lindman |
| 5,113,041 A | 5/1992 | Blonder et al. |
| 5,128,739 A | 7/1992 | Shirato |
| 5,150,407 A | 9/1992 | Chan |
| 5,220,501 A | 6/1993 | Lawlor |
| 5,237,614 A | 8/1993 | Weiss |
| 5,265,159 A | 11/1993 | Kung |
| 5,432,999 A | 7/1995 | Capps et al. |
| 5,572,696 A | 11/1996 | Sonobe |
| 5,613,012 A | 3/1997 | Hoffman |
| 5,631,947 A | 5/1997 | Wittstein et al. |
| 5,647,002 A | 7/1997 | Brunson et al. |
| 5,649,099 A | 7/1997 | Theimer et al. |
| 5,652,884 A | 7/1997 | Palevich |
| 5,664,207 A | 9/1997 | Crumpler |
| 5,666,530 A | 9/1997 | Clark et al. |
| 5,675,362 A | 10/1997 | Clough et al. |
| 5,684,984 A | 11/1997 | Jones |
| 5,687,322 A | 11/1997 | Deaton et al. |
| 5,694,546 A | 12/1997 | Reisman |
| 5,696,825 A | 12/1997 | Johnson et al. |
| 5,713,019 A | 1/1998 | Keaten |
| 5,717,925 A | 2/1998 | Harper |
| 5,727,202 A | 3/1998 | Kucala et al. |
| 5,745,884 A | 4/1998 | Carnegie et al. |
| 5,748,084 A | 5/1998 | Isikoff |
| 5,771,354 A | 6/1998 | Crawford et al. |
| 5,787,441 A | 7/1998 | Beckhardt et al. |
| 5,790,790 A | 8/1998 | Smith et al. |
| 5,832,483 A | 11/1998 | Barker et al. |
| 5,857,201 A | 1/1999 | Wright et al. |
| 5,857,206 A | 1/1999 | Tsutsumitake |
| 5,862,325 A | 1/1999 | Reed et al. |
| 5,862,346 A | 1/1999 | Kley et al. |
| 5,870,477 A | 2/1999 | Sasaki et al. |
| 5,870,759 A | 2/1999 | Bauer |
| 5,896,497 A | 4/1999 | Halstead |
| 5,903,881 A | 5/1999 | Schrader |
| 5,928,329 A | 7/1999 | Clark et al. |
| 5,940,843 A | 8/1999 | Zucknovich et al. |
| 5,958,007 A | 9/1999 | Lee et al. |
| 5,960,176 A | 9/1999 | Kuroki |
| 5,987,609 A | 11/1999 | Hasebe |
| 5,991,410 A | 11/1999 | Albert et al. |
| 5,999,947 A | 12/1999 | Zollinger et al. |
| 6,006,274 A | 12/1999 | Hawkins et al. |
| 6,034,621 A | 3/2000 | Kaufman |
| 6,049,671 A | 4/2000 | Slivka et al. |
| 6,085,191 A | 7/2000 | Fisher et al. |
| 6,085,192 A | 7/2000 | Mendez et al. |
| 6,108,787 A | 8/2000 | Anderson et al. |
| 6,125,388 A | 9/2000 | Reisman et al. |
| 6,128,739 A | 10/2000 | Fleming |
| 6,151,606 A | 11/2000 | Mendez |
| 6,160,873 A | 12/2000 | Truong |
| 6,167,253 A | 12/2000 | Farris |
| 6,236,971 B1 | 5/2001 | Stefik |
| 6,240,091 B1 | 5/2001 | Ginzboorg et al. |
| 6,286,102 B1 | 9/2001 | Cromer |
| 6,317,793 B1 | 11/2001 | Toyosawa et al. |
| 6,330,568 B1 | 12/2001 | Boothby et al. |
| 6,389,542 B1 | 5/2002 | Flyntz |
| 6,401,112 B1 | 6/2002 | Boyer et al. |
| 6,489,671 B2 | 12/2002 | Aoki et al. |
| 6,496,875 B2 | 12/2002 | Cheng et al. |
| 6,725,379 B1 | 4/2004 | Dailey |
| 6,778,651 B1 | 8/2004 | Jost |
| 6,813,487 B1 | 11/2004 | Trommelen et al. |
| 6,832,320 B1 | 12/2004 | Broyles, III et al. |
| 6,847,825 B1 | 1/2005 | Duvall et al. |
| 6,950,946 B1 | 9/2005 | Droz |
| 7,027,808 B2 | 4/2006 | Wesby |
| 7,047,426 B1 | 5/2006 | Andrews et al. |
| 7,054,594 B2 | 5/2006 | Bloch et al. |
| 7,113,912 B2 | 9/2006 | Stefik |
| 7,216,110 B1 | 5/2007 | Ogg |
| 7,260,380 B2 | 8/2007 | Dietl et al. |
| 7,480,907 B1 | 1/2009 | Marolia et al. |
| 7,496,957 B2 | 2/2009 | Howard et al. |
| 7,624,393 B2 | 11/2009 | Egan et al. |
| 7,624,444 B2 | 11/2009 | Gupta |
| 7,698,702 B2 | 4/2010 | Wetherly et al. |
| 7,702,322 B1 | 4/2010 | Maurya et al. |
| 7,844,964 B2 | 11/2010 | Marolia et al. |
| 7,908,339 B2 * | 3/2011 | Keith, Jr. .................. 709/217 |
| 7,921,182 B2 | 4/2011 | Hamasaki, Jr. et al. |
| 7,970,386 B2 | 6/2011 | Bhat et al. |
| 7,987,449 B1 | 7/2011 | Marolia et al. |
| 8,012,219 B2 | 9/2011 | Mendez et al. |
| 8,250,565 B2 | 8/2012 | Marolia et al. |
| 8,335,915 B2 * | 12/2012 | Plotkin et al. ................. 713/150 |
| 8,635,661 B2 | 1/2014 | Shahbazi |
| 8,696,765 B2 | 4/2014 | Mendez |
| 2001/0037407 A1 | 11/2001 | Dragulev |
| 2002/0002685 A1 | 1/2002 | Shim |
| 2002/0066034 A1 | 5/2002 | Schlossberg et al. |
| 2002/0077999 A1 | 6/2002 | Fergus |
| 2002/0098840 A1 | 7/2002 | Hanson et al. |
| 2002/0128972 A1 | 9/2002 | Stefik |
| 2002/0133465 A1 | 9/2002 | Stefik |
| 2002/0162011 A1 | 10/2002 | Tanaka |
| 2003/0023561 A1 | 1/2003 | Stefik |
| 2003/0097596 A1 | 5/2003 | Muratov |
| 2003/0149662 A1 | 8/2003 | Shore |
| 2003/0162555 A1 | 8/2003 | Loveland |
| 2004/0025053 A1 | 2/2004 | Hayward |
| 2004/0068721 A1 | 4/2004 | O'Neill et al. |
| 2004/0098715 A1 | 5/2004 | Aghera et al. |
| 2005/0003804 A1 | 1/2005 | Huomo et al. |
| 2007/0093243 A1 | 4/2007 | Kapadekar et al. |
| 2007/0130255 A1 | 6/2007 | Wolovitz |
| 2014/0181918 A1 | 6/2014 | Mendez |

FOREIGN PATENT DOCUMENTS

| | | |
|---|---|---|
| EP | 0899647 A2 | 3/1999 |
| EP | 0917077 A2 | 5/1999 |
| GB | 2346716 A | 8/2000 |
| JP | H05151091 A | 6/1993 |
| JP | H06309214 A | 11/1994 |
| JP | H06332858 A | 12/1994 |
| JP | H0877052 A | 3/1996 |
| JP | H08137732 A | 5/1996 |
| JP | 8314805 A | 11/1996 |
| JP | H0973423 A | 3/1997 |
| JP | H0981560 A | 3/1997 |
| JP | 9218815 A | 8/1997 |
| JP | 1115715 A | 1/1999 |
| JP | 2002216099 A | 8/2002 |
| JP | 2003005905 A | 1/2003 |
| WO | 9412938 | 6/1994 |
| WO | 9704389 | 2/1997 |
| WO | 9735265 | 9/1997 |
| WO | 0045243 A1 | 8/2000 |
| WO | 0212985 A2 | 2/2002 |

OTHER PUBLICATIONS

AT&T PocketNet Phone, 1996 Oct. 25, 2005.
Casio Cassiopeia E-115 Pocket PC User's Guide, 2000.
Combining Location and Data Management in an Environment for Total Mobility, Feb. 1, 1996.
Computer Associates Unicenter TNG Asset Management Option 3.1, Jan. 2001.
DARPA Open Object-Oriented Database Preliminary Module Specification, Change Management Module, Nov. 25, 1991.
How Not to Save Cached Internet Files with Roaming User Profiles, Dec. 5, 2003.

(56) References Cited

OTHER PUBLICATIONS

How to Install Microsoft Mobile Information Server 2002 Server Active Sync, Dec. 17, 2002.
IBM Tivoli Configuration Manager 4.2, Aug. 2002.
IBM Tivoli Monitoring Workbench, Feb. 2002.
Nokia 9000 Communicator, 1995.
Roam: A Scalable Replication System for Mobile and Distributed Computing, Jan. 1998.
Selective Replication: Fine Grain Control of Replicated Filed, Jan. 1995.
Sony Magic Link, 1994.
Users Guide: Hewlett Packard iPAQ hx2000 Series Pocket PC, 2004.
Windows History: Internet Explorer History, Jun. 30, 2003.
XcelleNet RemoteWare, 1996.
Microsoft Windows NT 4.0; Microsoft TechNet: Guide to MS Windows NT 4.0 Profiles and Policies.
M. Lambert, "PCMAIL: A Distributed Mail System of Personal Computers", Network Working Group, Jun. 1988, pp. 1-38.
3Com: Handbook for the Palm VTM Organizer—PDA Defense, 1998.
Infinite Technologies: Infinite Interchange User's Guide; Infinite InterChange.
Melnick, Dinman, Muratov et al: PDA Security Incorporating Handhelds into the Enterprise—PDA Defense, Apr. 2003.
Microsoft Press: Microsoft Windows NT Server Networking Guide (p. 3-10 and 65-78).
Microsoft Press: Windows NT Resource Guide (p. 279-287).
Microsoft Press: Windows NT Resource Guide (p. 39-48).
Microsoft: Chapter 3—Managing User Work Environments (server help), Jul. 25, 2013 and Oct. 11, 2013.
Micrsoft Systems Management Server 2003 with Device Management Feature Pack.
PDA Defense User Guide, 2000.
PDABomb Enterprise License—PDA Defense, Jul. 26, 2013 and Feb. 2001.
PDABombTM for Palm OS®—PDA Defense.
zTrace Technologies: zControlTM (zControl Datasheet).
zTrace Technologies: zSecurity Suite—Features and Benefits; zTrace zSecurity Suite, Jun. 13, 2002.
zTrace Technologies: zSecurity Suite (zTrace Feature Matrix), Jun. 13, 2002.
PDA Defense 3.1 by Asynchrony Solutions, Inc.
Fulchignoni, Paola; Marrota, Giovanni; Wiley, Anthony J. "Applying Security to SMDS: A Practical Example." Proceedings, INFOCOM '93. vol. 3. Pub. Date: 1993. Relevant pp. 1414-1421. http://ieeexplore.ieee.org/stamp/ stamp.jsp ?tp=&arnumber =253407.

* cited by examiner

SYSTEM AND METHOD OF DATA SECURITY IN SYNCHRONIZING DATA WITH A WIRELESS DEVICE

RELATED APPLICATION

This is a continuation application of U.S. application Ser. No. 13/183,138 entitled "System and Method of Data Security in Synchronizing Data with a Wireless Device" and filed Jul. 14, 2011, which is a continuation application of U.S. application Ser. No. 11/261,529 entitled "System and Method of Data Security in Synchronizing Data with a Wireless Device" and filed Oct. 28, 2005, the entire contents of each of which are incorporated herein by reference. U.S. application Ser. No. 11/261,529 is a non-provisional application based on a provisional application Ser. No. 60/622,813 filed on Oct. 28, 2004 and claims priority thereof.

FIELD OF THE INVENTION

This invention relates generally to the filed of data synchronization. More particularly, the invention relates to a system and method for secure synchronization between server and a device.

BACKGROUND

A variety of wireless data processing devices have been introduced over the past several years. These include wireless personal digital assistants ("PDAs") such as the Palm® VIIx handheld, cellular phones equipped with data processing capabilities (e.g., those which include wireless application protocol ("WAP") support), and, more recently, wireless messaging devices such as the Blackberry™ wireless pager developed by Research In Motion ("RIM").™

Presently, a synchronization client on a wireless device watches for changes in a personal information manager ("PIM") database and uses a network connection to keep the records on a synchronization server and the records in the PIM database synchronized with each other. During this synchronization the PIM database is accessible, and the data is not protected.

BRIEF DESCRIPTION OF THE DRAWINGS

A better understanding of the present invention can be obtained from the following detailed description in conjunction with the following drawings, in which.

DETAILED DESCRIPTION

According to one embodiment a system for protecting personal information manager ("PIM") data on a device is disclosed. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
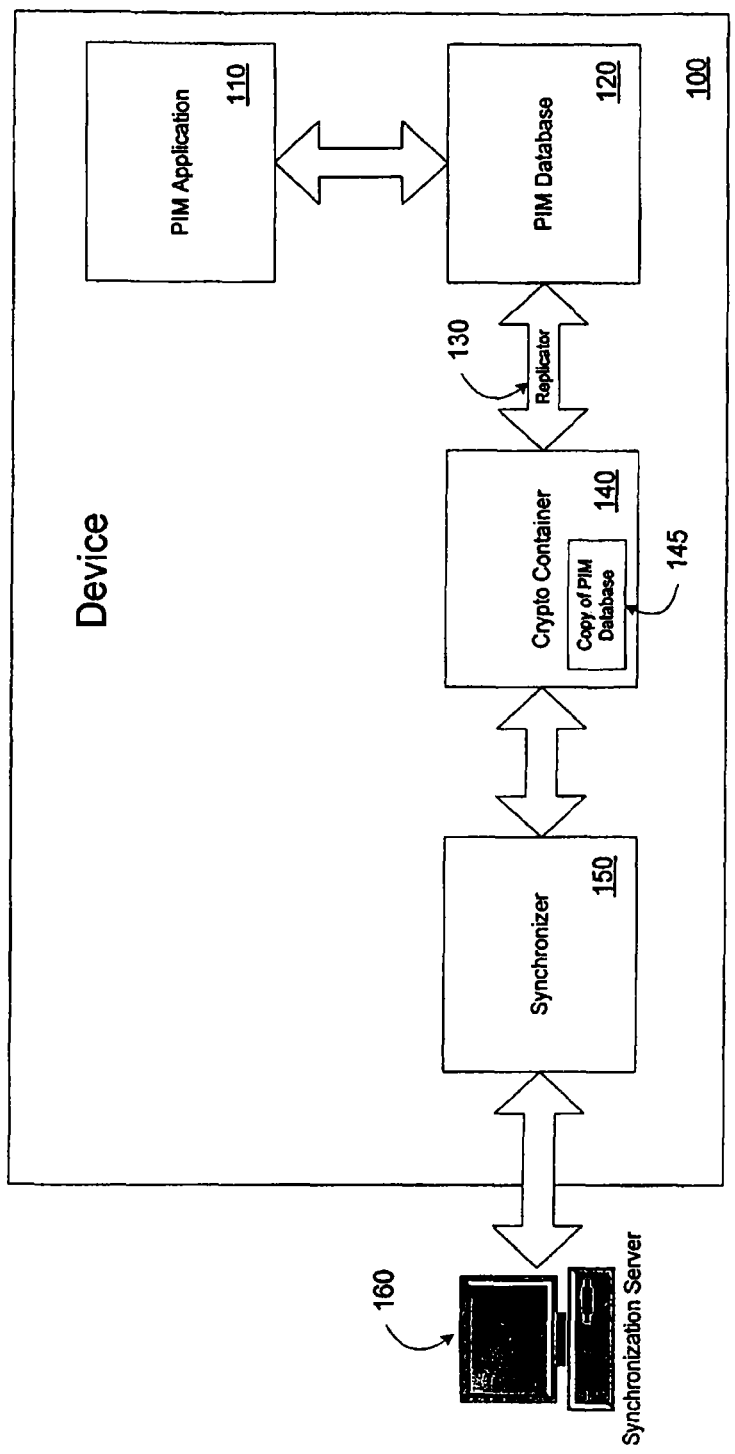
FIG. 1 illustrates one embodiment of a block diagram of a device for secure synchronization with a synchronization server.

FIG. 1 illustrates one embodiment of a block diagram of a device 100 securely synchronizing with a synchronization server 160. Device 100 includes a Personal Information Manager (PIM) application 110, a PIM database 120, a replicator 130, a crypto container 140 and a synchronizer 150.

PIM application 110 is coupled to PIM database 120. PIM application 110 is a program implementation of a PIM. PIM database is a database that includes PIM information. In one embodiment, the PIM information is kept in separate records.

Crypto container 140 includes a copy of the PIM database ("copyDB") 145. Crypto container 140 maintains the data inside copyDB 145 in an encrypted format. Crypto container 140 provides an application program interface ("API") for reading and writing of the data in an unencrypted form. In one embodiment, access to the data in copyDB 145 is only available through the API.

In one embodiment, crypto container 140 may be in an unlocked or a locked state. When crypto container 140 is in the unlocked state cipher keys are initialized and external applications (e.g. PIM application 110) have access to the data in copyDB 145 via the API. In the locked state, the cipher keys are erased and external applications do not have access to the data in copyDB 145.

In one embodiment, SureWave™ Mobile Defense developed by JP Mobile, Inc™ provides for the implementation of crypto container 140. However, other implementations may be used. The data in copyDB 145 may be stored in a database format, or in another embodiment, the data may be stored in a file or file system via a system driver.

Replicator 130 is coupled to PIM databse 120 and crypto container 140. Replicator 130 synchronizes PIM database 120 with copyDB 145.

Synchronizer 150 is coupled to crypto container 140 and synchronization server 160. In one embodiment, synchronizer 150 is implemented using SureWave™ Manager developed by JP Mobile, Inc™. However, other implementations may be used. Synchronizer 150 synchronizes copyDB 145 and synchronization server 160 via a network connection. In one embodiment, the network connection is wired. However, the network connection may be wireless.

In one embodiment, device 100 may operate in one of the three following states: low security, medium security, and high security. The following table illustrates the possible transitions between states for device 100.

| Initial state | Final state | Condition |
| --- | --- | --- |
| Low security | Medium security | Manual lock, auto-lock, remote lock |
| Medium security | High security | Security alert or remote lock |
| Low security | High security | Security alert or remote lock |
| High security | Low security | Device unlock |
| Medium security | Low security | Device unlock |

The security state of device 100 may change for various reasons. Some of the reasons may include: failed attempts to enter a password for device 100 have exceeded a predetermined amount, an attempted remote command via short message service ("SMS") or electronic mail ("e-mail") may have occurred, or a network intrusion may have been detected. However, other reasons may cause an increase in the security state of device 100.

In one embodiment, the low security state, the medium security state, and the high security state of device 100 correspond to an unlocked device mode, a locked/sync device mode, and a lock/emergency device mode, respectively.

In the unlocked device mode, copyDB 145 is unlocked. Synchronizer 150 is authorized to synchronize data between synchronization server 160 and copyDB 145. Replicator 130 is also authorized to synchronize the data in PIM database 120 and copyDB 145. The PIM data in PIM database 120 is available for use by PIM application 110, and the graphical user interface ("GUI") of device 100 is unblocked.

In the locked/sync mode, PIM database 120 is cleared, and no unencrypted data is available. The PIM data in PIM database 120 is unavailable to PIM application 110. Replicator 130 is stopped, and copyDB 145 is unlocked. Synchronizer 150 is still authorized to synchronize data between synchronization server 160 and copyDB 145.

In the locked/emergency mode, PIM database 120 is cleared and no unencrypted data is available. The PIM data in PIM database 120 is unavailable to PIM application 110. Replicator 130 is stopped, copyDB 145 is locked, and cipher keys are cleared. Synchronizer 150 is also stopped, and the network connection is closed.

Figure 2:
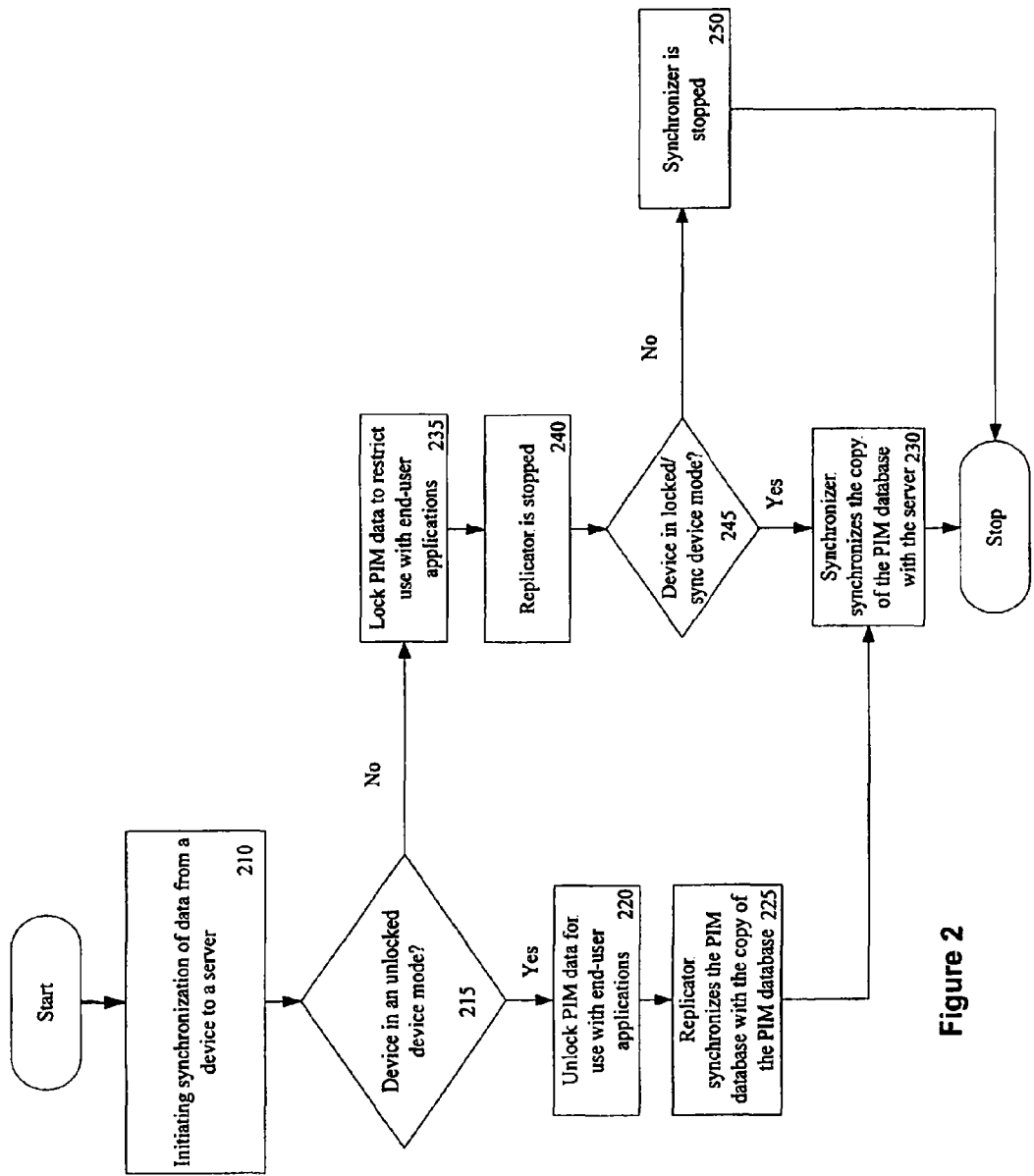
FIG. 2 illustrates one embodiment of a flow diagram for secure synchronization of a device with a synchronization server.

FIG. 2 illustrates one embodiment of a flow diagram for secure synchronization of a device with a synchronization server. At process block 210, synchronization between device 100 and synchronization server 160 is initiated. At decision block 215, it is determined whether device 100 is in the unlocked device mode.

If device 100 is in the unlocked device mode then the PIM data is unlocked for use by application 110, process block 220. At process block 225, replicator 130 synchronizes the data in PIM database 120 and copyDB 145. At process block 230, synchronizer 150 synchronizes data between synchronization server 160 and crypto container 140.

If device 100 is not in the unlocked device mode then the PIM data in PIM database 120 is locked and thus unavailable to PIM application 110, process block 235. At process block 240, replicator 130 is stopped. At decision block 245, it is determined whether device 100 is in the locked/sync mode.

If device 100 is in the locked/sync mode then synchronizer 150 synchronizes data between synchronization server 160 and crypto container 140, process block 230.

If device 100 is not in the locked/sync mode then device 100 is in the locked/emergency mode synchronizer 150 is stopped, process block 250.

The system described above provides for an efficient mechanism to protect PIM data on a device connected to a server.

Figure 3:
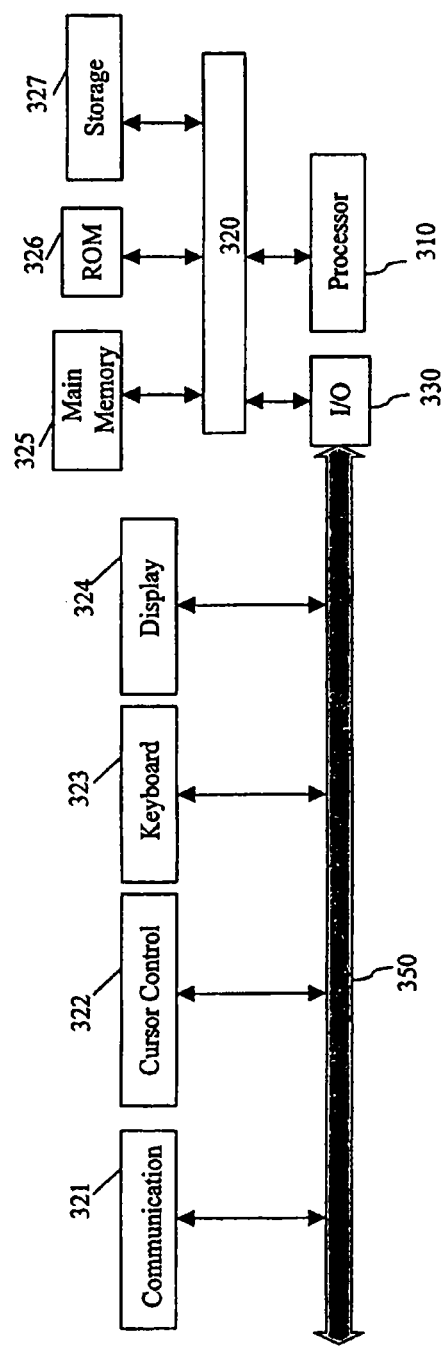
FIG. 3 illustrates one embodiment of a computer system.

FIG. 3 illustrates a computer system 300 on which device 100 and or synchronization server 160 may be implemented. Computer system 300 includes a system bus 320 for communicating information, and a processor 310 coupled to bus 320 for processing information. According to one embodiment, processor 310 is implemented using one of the multitudes of Motorola ARM family of processors of microprocessors. Nevertheless one of ordinary skill in the art will appreciate that other processors may be used.

Computer system 300 further comprises a random access memory (RAM) or other dynamic storage device 325 (referred to herein as main memory), coupled to bus 320 for storing information and instructions to be executed by processor 310. Main memory 325 also may be used for storing temporary variables or other intermediate information during execution of instructions by processor 310. Computer system 300 also may include a read only memory (ROM) and/or other static storage device 326 coupled to bus 320 for storing static information and instructions used by processor 310.

A data storage device 325 such as a magnetic disk or optical disc and its corresponding drive may also be coupled to computer system 300 for storing information and instructions. Computer system 300 can also be coupled to a second I/O bus 350 via an I/O interface 330. A plurality of I/O devices may be coupled to I/O bus 350, including a display device 324; an input device (e.g., an alphanumeric input device 523 and/or a cursor control device 322).

The communication device 321 is for accessing other computers (servers or clients) via a network. The communication device 321 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

The invention claimed is:

1. A wireless device, comprising:
a client application;
a first database configured to store data for access by the client application;
a second database configured to store data in an encrypted format;
a replicator for synchronizing the data stored in the first database with encrypted data stored in the second database; and
a synchronizer for synchronizing the encrypted data stored in the second database with data stored in a server,
the wireless device being configured to operate selectively in a plurality of security levels,
wherein the wireless device is configured such that, when operating in a first security level of the plurality of security levels, the synchronizer synchronizes the encrypted data stored in the second database with the data stored in the server, and access by the client application to data stored in the first database is restricted.

2. The wireless device of claim 1, wherein, when the wireless device is operating in the first security level, the wireless device is configured to restrict synchronization, by the replicator, of the data stored in the first database with the encrypted data stored in the second database.

3. The wireless device of claim 1, wherein, when the wireless device is operating in the first security level, the wireless device is configured to delete the data stored in the first database.

4. The wireless device of claim 1, wherein the plurality of security levels includes a second security level, different to the first security level, and the wireless device is configured such that, when operating in the second security level, the synchronizer synchronizes the encrypted data stored in the second database with the data stored in the server, and the replicator synchronizes data stored in the first database with the encrypted data stored in the second database.

5. The wireless device of claim 1, wherein the plurality of security levels includes a third security level, different to the first security level and the second security level, wherein the first database, second database, synchronizer and replicator are disabled when the wireless device is operating in the third security level.

6. The wireless device of claim 1, wherein the wireless device is configured to change a said security level based on one or more of the following:
    failed attempts to enter a password for the device exceeds a predetermined amount, occurrence of an attempted remote command via short message service ("SMS"), and detection of a network intrusion.

7. The wireless device of claim 1, wherein the synchronized device data comprises personal information manager data.

8. A system comprising:
    a server configured to store data; and
    a wireless device communicatively coupled to the server, the wireless device, including:
        a client application;
        a first database configured to store data for access by the client application;
        a second database configured to store data in an encrypted format;
        a replicator for synchronizing the data stored in the first database with encrypted data stored in the second database; and
        a synchronizer for synchronizing the encrypted data stored in the second database with the data stored in the server,
        the wireless device being configured to operate selectively in a plurality of security levels,
    wherein the wireless device is configured such that, when operating in a first security level of the plurality of security levels, the synchronizer synchronizes the encrypted data stored in the second database with the data stored in the server, and access by the client application to data stored in the first database is restricted.

9. The system of claim 8, wherein the device is coupled to the server via one of: a wired network, and a wireless network.

10. A method of controlling access to data held on a wireless device, the wireless device comprising a first database and a second, different, database, the first database being configured to store data for access by a client application on the wireless device the second database being configured to store data in an encrypted format, the wireless device being configured to synchronize data stored in the first database with encrypted data stored in the second database and to synchronize encrypted data stored in the second database with data stored on a server remote from the wireless device, and the wireless device being configured to operate in a plurality of security modes, including a first security mode, the method comprising:
    determining whether the wireless device is operating in said first security mode; and
    responsive to a determination that the wireless device is operating in the first security mode, configuring the wireless device so as to restrict access by the client device to data stored in the first database, and to synchronize the encrypted data in the second database with data store in the server.

11. The method of claim 10 comprising:
    responsive to a determination that the device is operating in the first security mode, configuring the wireless device to restrict the synchronization of the data stored in the first database with the encrypted data.

12. The method of claim 10 comprising:
    determining whether the wireless device is operating in a second security mode, different to the first security mode; and
    responsive to a determination that the wireless device is operating in the second security mode, configuring the wireless device to synchronize the data stored in the first database with the encrypted data stored in the second database, and to synchronize the encrypted data stored in the second database with the server.

13. The method of claim 12, comprising, responsive to the determination that the wireless device is operating in the second security mode, providing the client application access to the data stored in first database.

14. The method of claim 10, in which the determination that the wireless device is operating in the first security mode is based on one of the following: failed attempts to enter a password for the device exceeds a predetermined number, occurrence of an attempted remote command via short message service ("SMS"), and detection of a network intrusion.

15. The method of claim 10, comprising erasing cipher keys associated with the encrypted data in the second database in response to determining that the wireless device is operating in the first security mode.

16. The method of claim 10, comprising deleting the data stored in the first database in response to determining that the wireless device is operating in the first security mode.

17. A non-transitory computer readable storage medium storing computer readable instructions thereon for execution on a wireless device to implement a method of controlling access to data stored thereon, the wireless device comprising a first database and a second, different, database, the first database being configured to store data for access by a client application on the wireless device the second database being configured to store data in an encrypted format, the wireless device being configured to synchronize data stored in the first database with encrypted data stored in the second database and to synchronize encrypted data stored in the second database with data stored on a server remote from the wireless device, and the wireless device being configured to operate in a plurality of security modes, including a first security mode, the computer-readable instructions, when executed on a processor of the wireless device, causing the processor to perform the method comprising:
    determining whether the wireless device is operating in said first security mode; and
    responsive to a determination that the wireless device is operating in the first security mode, configuring the wireless device so as to restrict access by the client device to data stored in the first database, and to synchronize the encrypted data in the second database with data store in the server.

18. The non-transitory computer readable storage medium of claim 17, wherein the computer readable instructions, when executed on a processor of the wireless device, cause the processor, responsive to said determination, to restrict synchronization of the data stored in the first database with the encrypted data stored in the second database.

\* \* \* \* \*

UNITED STATES PATENT AND TRADEMARK OFFICE
CERTIFICATE OF CORRECTION

| | | |
|---|---|---|
| PATENT NO. | : 9,158,829 B2 | Page 1 of 1 |
| APPLICATION NO. | : 13/847621 | |
| DATED | : October 13, 2015 | |
| INVENTOR(S) | : Alexander Muratov | |

It is certified that error appears in the above-identified patent and that said Letters Patent is hereby corrected as shown below:

In the Title page, Item (63) under "Related U.S. Application Data", paragraph 1, lines 3 and 4, "filed on Oct. 25, 2005" should read "filed on Oct. 28, 2005".

Signed and Sealed this
Fifth Day of April, 2016

Michelle K. Lee
*Director of the United States Patent and Trademark Office*